Patented Mar. 10, 1925.

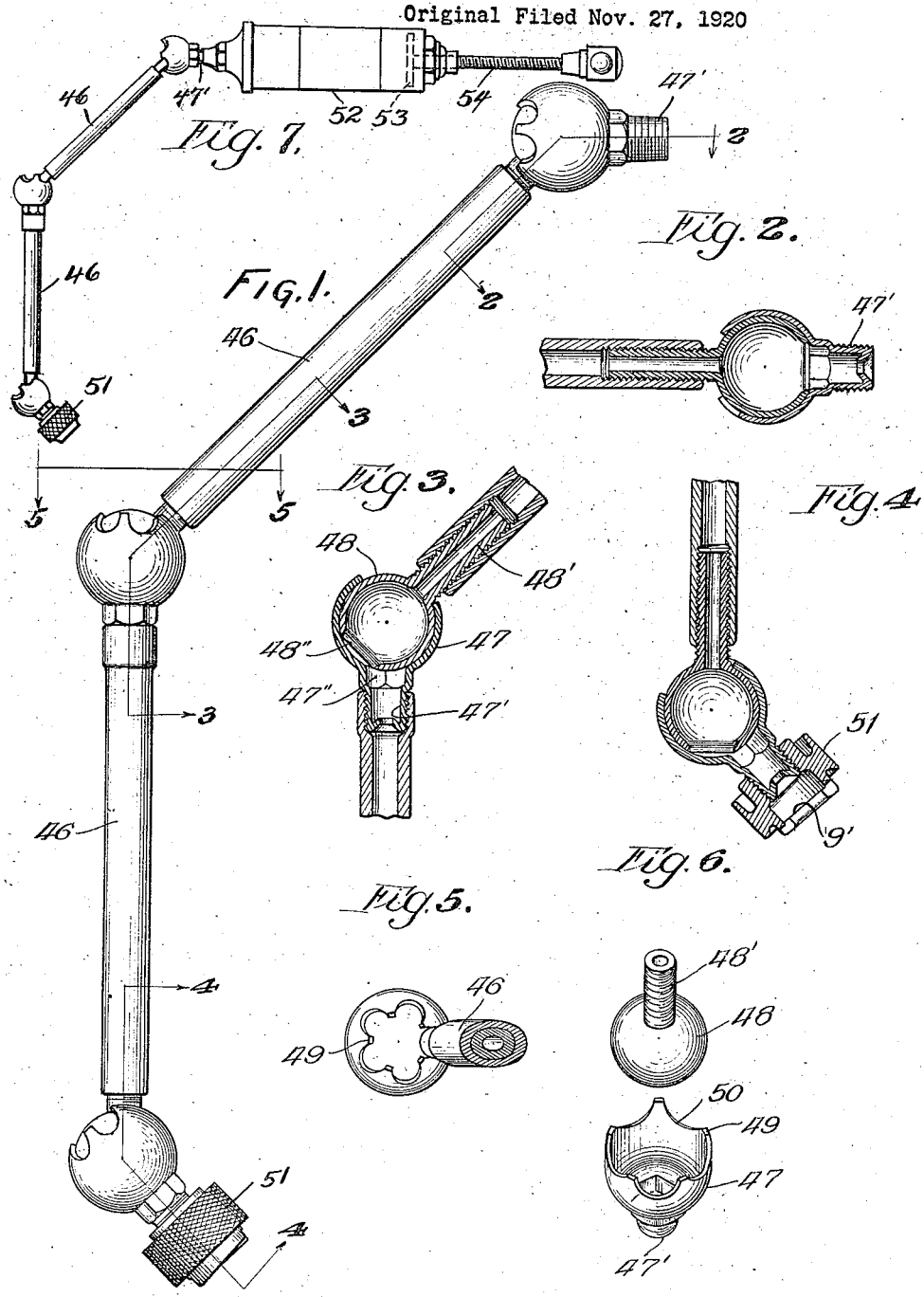

1,528,967

UNITED STATES PATENT OFFICE.

MARTIN C. BERSTED, OF CHICAGO, ILLINOIS.

FLEXIBLE CONDUIT.

Original application filed November 27, 1920, Serial No. 426,722. Divided and this application filed September 3, 1921. Serial No. 498,591.

*To all whom it may concern:*

Be it known that I, MARTIN C. BERSTED, a citizen of the United States, residing at Chicago, in the county of Cook and State of Illinois, have invented certain new and useful Improvements in Flexible Conduits, of which the following is a specification.

This application relates to improvements in flexible conduits primarily intended for use in connection with grease guns, and is a division of my application Serial No. 426,-722, filed November 27, 1920.

An object of this invention is to provide a flexible conduit for use in place of the flexible tubing customarily attached to grease guns which will perform all the functions of such tubing and possess many advantages thereover.

More specifically, an object of the invention is to provide a conduit composed of a plurality of sections universally connected by joints permitting wide, angular adjustment whereby the conduit may be given a particular formation necessary to conveniently reach a fitting and rigidly held in that position while the grease gun is being operated. Another object is to provide joints which while allowing all the necessary movement will remain tight in use under the pressure customarily applied in forcing grease into bearings.

In the accompanying drawings illustrating a selected embodiment of the invention—

Fig. 1 is an elevation showing the flexible conduit;

Figs. 2, 3, 4 and 5 are sectional views on the lines 2—2, 3—3, 4—4 and 5—5 respectively of Fig. 1.

Fig. 6 is a perspective view showing the ball and socket of one of the joints separated.

Fig. 7 is an elevation on a reduced scale showing a lubricator comprising a grease gun containing the lubricant and a discharge conduit extending therefrom consisting of the jointed tube sections illustrated in the other figures.

The flexible conduit is made up of a plurality of tubular sections 46 connected by ball and socket joints each comprising a socket or shell 47 secured in the end of one section, and a hollow ball 48 secured in the end of the other section, the socket and ball being made complementary to each other so that the ball will fit snugly in the socket and yet be capable of freely moving therein. The socket or shell has a threaded stem 47' and the ball 48 has a threaded stem 48' to screw into the ends of the tube sections, but these stems may be pressed or otherwise secured in the tube section if desired. The ball is provided with an opening 48" of sufficient size to form a communication with the opening 47" in the stem 47' of the socket 47 in any adjustment of the ball relative to the socket. The socket or shell is provided with prongs 49 and intermediate recesses 50 (Fig. 6) and after the ball has been inserted in the socket these prongs are pressed down as shown to secure the ball in the socket. The recesses 50 are adapted to receive the stem 48' of the ball and when the stem is seated in any recess the adjacent prongs will rigidly interlock the ball and socket and consequently the tube sections carrying said ball and socket. The number of recesses will be sufficient to permit any required adjustment of the tube sections relative to each other and the capacity of the tube for various adjustments is indicated in Fig. 1.

One end of the conduit is provided with a ball and socket similar to that just described, the stem 47' of the socket being adapted for connection with the cap of a pump, preferably of the form shown in my copending application Ser. No. 498,590, filed September 3, 1921. The other end of the conduit is also provided with a ball and socket and a collar is arranged on the threaded stem of the socket and is adapted for engagement with a fitting of the kind set forth in my copending application 426,722, November 27, 1920. I have shown this collar as having cams 9' to engage studs on the fitting shown in that application, but it is obvious that the flexible conduit is not limited to use with grease guns and fittings of this or any other type.

In Fig. 7 I have shown a complete lubricator embodying my invention in which the grease gun comprises a barrel 52 adapted to contain the lubricant, a plunger 53 carried in the barrel by a screw stem 54 operating through one end of the barrel, with the flexible conduit attached to the other end of the barrel and forming a discharge conduit extending therefrom to deliver the lubricant to a part to be lubricated, to which the outermost section of the conduit is attached.

I am aware that changes in the form and proportion of parts, and in the details of construction of my invention may be made without departing from the spirit or sacrificing the advantages thereof, and I reserve the right to make all such changes as fairly fall within the scope of the following claims:

I claim:

1. A grease gun tube comprising a plurality of tube sections for universal adjustment, ball and socket joints connecting said sections and means for locking the sections in angular adjustment.

2. A grease gun tube comprising a plurality of tube sections, a ball and socket joint connecting each pair of sections for universal adjustment, and means on the socket section for engaging the ball section to hold the two sections in angular adjustment.

3. A grease gun tube comprising a plurality of tube sections, a ball and socket joint connecting each pair of sections for universal adjustment, the socket having a plurality of alternating prongs and recesses extending around its edge adapted to engage the ball section for holding the sections in angular adjustment.

4. A grease gun tube comprising a plurality of tube sections, a ball and socket joint connecting each pair of sections and comprising an integral socket member having a hollow stem communicating with the bore of the socket tube section, an integral hollow ball member fitting and operating in the socket member and having a hollow stem communicating with the bore of the ball tube section, said sections being angularly adjustable relative to each other and said ball having an opening of sufficient size to form a communication with the hollow stem of the socket member in any adjustment of the two tube sections.

5. A grease gun tube comprising a plurality of tube sections, a ball and socket joint connecting each pair of sections and having a passage extending therethrough to permit the flow of grease under pressure from one tube section to the other, the ball of said socket joint being hollow and made of thin metal and adapted to expand under the grease pressure to make a tight fit in the socket of said joint.

MARTIN C. BERSTED.